United States Patent Office 2,737,537
Patented Mar. 6, 1956

2,737,537

PRODUCTION OF AROMATIC HYDROCARBONS BY CATALYTIC ISOMERIZATION OF 2:5 DI-METHYLHEX-3-YNE-1:5 DIENE

Arthur William Charles Taylor, David Gwyn Jones, and Morag Lauchlan Noble, Norton-on-Tees, England, assignors to Imperial Chemical Industries Limited, a corporation of Great Britain No Drawing. Application December 27, 1951,
Serial No. 263,682

Claims priority, application Great Britain
January 17, 1951

6 Claims. (Cl. 260—673.5)

This invention relates to the production of xylene hydrocarbons.

According to the present invention, there is provided a process for the production of hydrocarbon mixtures comprising p-xylene, which comprises the step of contacting 2:5-dimethylhex-3-yne-1:5-diene in the vapour phase and at elevated temperature with an isomerisation catalyst.

A wide range of catalysts may be employed in the process of the present invention. Thus, alumina, alumina-silica gels, activated clays and chromic oxide-alumina may be employed.

A suitable chromic oxide-alumina catalyst may be prepared, for example, by dehydrating alumina trihydrate at a temperature of 400° C. until its water content is 9 to 11% by weight. The alumina is then pelleted, using a suitable pelleting lubricant, and, if necessary, the pellets may then be calcined at a temperature of 700° C. to remove the pelleting lubricant. They are finally immersed in a solution of chromic acid, removed and dried. It is desirable to have a chromium oxide content in the region of 10 to 15% by weight. The incorporation in the catalyst of magnesium chromate in a minor amount equivalent to, for example, 2% by weight of MgO, enhances the activity and tends to increase the life of the catalyst. A chromic oxide-alumina catalyst may also be prepared by co-precipitating the oxides and subsequently pelleting the product.

Other suitable catalysts may be produced by contacting alumina, either alone or together with oxides such as thoria, beryllia, zirconia and titania with a fluorinating agent such as fluorine, hydrogen fluoride, silicon tetrafluoride, boron trifluoride, fluorides of phosphorus, fluorine-containing interhalogen compounds and fluosilicic acid. In the production of catalysts of this type, it is preferable to employ a substantially anhydrous oxide as starting material, and to carry out fluorination step at a temperature and for a duration such that the fluorine content of the final catalyst does not exceed 5% by weight.

The 2:5-dimethylhex-3-yne-1:5-diene is preferably contacted with the catalyst in a continuous manner. The optimum temperature at which the reaction is carried out depends upon the catalyst employed, but, in general, temperatures within the range of 300° C. to 600° C. are suitable.

The reaction may be carried out when operating in a continuous manner in the presence of a carrier gas, such as hydrogen or nitrogen, which may be mixed with the vaporised hydrocarbon, and the mixture contacted with the catalyst maintained at the desired temperature. It is convenient to introduce the carrier gas at a rate similar to the rate of passage of the hydrocarbon vapour through the reaction zone.

Xylenes produced in the process of the present invention may be separated from the product by, for example, fractional distillation.

The 2:5 dimethylhex-3-yne-1:5-diene employed in the process of the present invention may be produced by condensing acetone with acetylene in the presence of potassium hydroxide to give 2:5-dimethylhex-3-yne-2:5-diol:

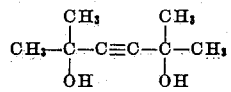

and subsequently dehydrating this, either by treatment with dehydrating agents in the liquid phase, or by catalytic treatment in the vapour phase.

When operating in the liquid phase, particularly suitable dehydrating agents are an aqueous solution of phosphoric acid containing 60% by weight of $H_3PO_4$, and sulphuric acid containing 10% to 40% by weight of $H_2SO_4$. Other dehydrating agents which may be used include alumina, p-toluene sulphonic acid, and acetic anhydride, preferably containing a small amount of sulphuric acid. In a convenient method of carrying out the dehydration, the diol and phosphoric acid are heated together at a temperature in the region of 100° C., a stream of carbon dioxide being passed through the mixture to remove the 2:5-dimethylhex-3-yne-1:5-diene immediately upon its formation. By operating in this manner, there is obtained a mixture comprising water and 2:5-dimethylhex-3-yne-1:5-diene; the latter, which separates out as an upper layer, may be removed by decantation, and purified, if desired, by fractional distillation.

When this dehydration reaction is carried out catalytically in the vapour phase, the preferred catalysts are siliceous earths, such as mordenite and bentonite, alumina, alumina-silica gel, thoria, zinc oxide, basic aluminium phosphate, phosphoric acid supported on an inert material, such as kieselguhr, coke or charcoal, and the blue oxide of tungsten. The reaction is preferably carried out at temperatures within the range of 200° to 450° C.

The dehydration may give rise to a minor amount of 2:5-dimethylhex-3-yne-1-ene-5-ol. This compound is preferably recycled to the dehydration zone together with a fresh amount of 2:5-dimethylhex-3-yne-2:5-diol.

Example 250 grams of 2:5-dimethylhex-3-yne-2:5-diol and 2500 ml. of phosphoric acid, containing 60% by weight of $H_3PO_4$, were heated in a current of carbon dioxide. During the course of the dehydration, 2:5-dimethylhex-3-yne-1:5-diene distilled with steam from the flask. This mixture was condensed, the water continously separated from the oil layer and re-introduced into the flask to maintain the phosphoric acid concentration at a constant value. The oil layer on distillation gave 127 gm. of 2:5-dimethyl-hex-3-yne-1:5-diene (corresponding to a yield of 68%), and 22.7 gm. of 2:5-dimethylhex-3-yne-1-ene-5-ol (corresponding to a yield of 10.4%), the latter being recycled to a subsequent dehydration with a fresh amount of 2:5-dimethyl-3-yne-2:5-diol.

58.5 grams of 2:5-dimethylhex-3-yne-1:5-diene were passed at a rate of 25 ml./hr. over 50 ml. of a catalyst which comprised 13% by weight of oxides of chromium, 85% by weight of activated alumina, and 2% by weight of magnesia, present as magnesium chromate. The catalyst was maintained at a temperature of 450° C., and hydrogen was passed through the converter at a rate of 5 litre/hour. 37.9 grams of liquid product were obtained. This was found by distillation and ultra-voilet and infra-red analysis to contain:

|                                         | Gm.  |
|-----------------------------------------|------|
| Unchanged 2:5-dimethylhex-3-yne-1:5-diene | 14.1 |
| p-Xylene                                | 5.2  |
| m-Xylene                                | 0.3  |
| Residue                                 | 16.0 |

The residue consisted of highly unsaturated hydrocarbons, formed by the polymerisation of the acetylenic diene. The pass yield of p-xylene is 8.9%, and the yield 11.7%.

We claim:

1. A process for the production of hydrocarbon mixtures containing paraxylene which comprises the step of contacting 2:5-dimethylhex-3-yne-1:5-diene in the vapour phase at a temperature within the range of from 300° to 600° C. with a catalyst consisting essentially of effective amounts of an alumina-containing catalyst selected from the group consisting of alumina, alumina silica gels, fluorinated alumina, fluorinated mixtures of alumina with thoria, mixtures of alumina with beryllia, fluorinated mixtures of alumina with zirconia, fluorinated mixtures of alumina with titania, and alumina with chromic oxide.

2. A process for the production of hydrocarbon mixtures containing paraxylene which comprises the step of contacting 2:5-dimethylhex-3-yne-1:5-diene in the vapour phase at a temperature within the range of from 300° to 600° C. with a catalyst consisting essentially of effective amount of chomic oxide and alumina.

3. A process as recited in claim 2 in which the catalyst contains from about 10 to about 15% by weight of chromium oxide and a minor proportion of magnesium chromate equivalent to about 2% by weight of MgO.

4. A process for the production of hydrocarbon mixtures containing paraxylene which comprises the step of continuously contacting 2:5-dimethylhex-3-yne-1:5-diene in the vapour phase at a temperature within the range of from 300° to 600° C., and in the presence of a carrier gas with a catalyst consisting essentially of effective amounts of chromic oxide and alumina.

5. A process for the production of hydrocarbon mixtures containing p-xylene in the substantial absence of other xylene isomers which comprises the step of contacting 2:5-dimethylhex-3-yne-1:5-diene in the vapour phase at a temperature within the range of from 300° to 600° C. with a catalyst consisting essentially of effective amounts of an alumina-containing catalyst selected from the group consisting of alumina, alumina silica gels, fluorinated alumina, fluorinated mixtures of alumina with thoria, fluorinated mixtures of alumina with beryllia, fluorinated mixtures of alumina with zirconia, fluorinated mixtures of alumina with titania, and alumina with chromic oxide.

6. A process for the production of hydrocarbon mixtures containing p-xylene in the substantial absence of other xylene isomers from readily available raw material which comprises condensing acetone and acetylene to yield 2:5-dimethylhex-3-yne-2:5-diol, dehydrating this diol to give 2:5-dimethylhex-3-yne-1:5-diene, contacting said diene in the vapour phase at a temperature within the range of from 300° to 600° C. with a catalyst consisting essentially of effective amounts of an alumina-containing catalyst selected from the group consisting of alumina, alumina silica gels, fluorinated alumina, fluorinated mixtures of alumina with thoria, fluorinated mixtures of alumina with beryllia, fluorinated mixtures of alumina with zirconia, fluorinated mixtures of alumina with titania, and alumina with chromic oxide, and removing the mixture of xylenes so produced to thereby obtain p-xylene in the substantial absence of other xylene isomers.

References Cited in the file of this patent

UNITED STATES PATENTS

| 2,217,011 | Grosse et al. | Oct. 8, 1940 |
| 2,217,014 | Grosse et al. | Oct. 8, 1940 |
| 2,250,445 | Bruson et al. | July 29, 1941 |
| 2,250,558 | Vaughn | July 29, 1941 |
| 2,302,345 | Pesta et al. | Nov. 17, 1942 |
| 2,363,768 | Zetterholm | Nov. 28, 1944 |

OTHER REFERENCES

Mitchell et al.: Jour. Amer. Chem. Soc., vol. 55 (1933), pages 4276–4279 (4 pages).